United States Patent [19]
Miller et al.

[11] Patent Number: 5,591,506
[45] Date of Patent: Jan. 7, 1997

[54] NON-POLLUTING ALKALI-METAL BISULFATE SYSTEM FOR PRODUCING TITANIUM DIOXIDE PIGMENT

[75] Inventors: Jorge Miller; Miguel Kling, both of Bogota, Colombia

[73] Assignee: Kemicraft Overseas Limited, Douglas, Isle of Man

[21] Appl. No.: 438,922

[22] Filed: May 10, 1995

[51] Int. Cl.⁶ .................. C01G 23/047; C01G 49/02
[52] U.S. Cl. .................. 423/81; 423/84; 423/610; 423/633
[58] Field of Search ................. 423/81, 84, 610, 423/633

[56] References Cited

U.S. PATENT DOCUMENTS

| | | |
|---|---|---|
| Re. 19,594 | 5/1935 | Leuchs ........................ 423/84 |
| 1,184,131 | 5/1916 | Rossi ........................... 423/84 |
| 1,206,798 | 12/1916 | Barton ......................... 423/84 |
| 1,341,307 | 5/1920 | Farup .......................... 423/84 |
| 1,695,270 | 12/1928 | Barton et al. ................ 423/84 |
| 1,695,341 | 12/1928 | Monk .......................... 423/84 |
| 3,057,685 | 10/1962 | Kamlet ........................ 423/81 |
| 3,761,563 | 9/1973 | Kaiser et al. ................ 423/84 |

FOREIGN PATENT DOCUMENTS 1006374  3/1983  U.S.S.R. .................. 423/610

*Primary Examiner*—Steven Bos
*Attorney, Agent, or Firm*—Jacobson, Price, Holman & Stern, PLLC

[57] ABSTRACT

Alkali-metal bisulfate is employed in a non-polluting and economically-feasible system for producing titanium dioxide pigment from titanium mineral or slag with recycling of alkali-metal bisulfate and ammonia.

14 Claims, 1 Drawing Sheet

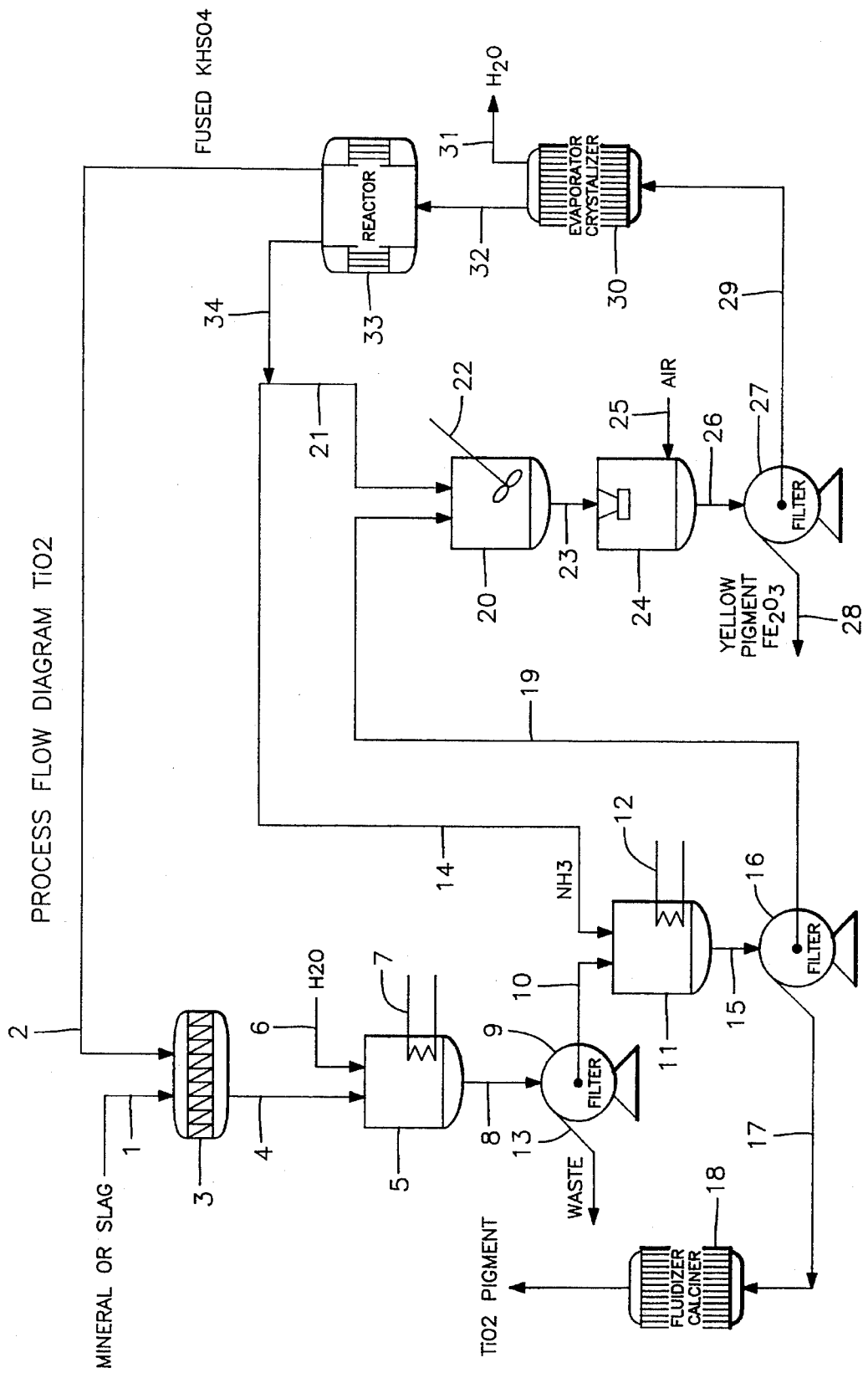
FIG. 1 PROCESS FLOW DIAGRAM TiO2

NON-POLLUTING ALKALI-METAL BISULFATE SYSTEM FOR PRODUCING TITANIUM DIOXIDE PIGMENT

BACKGROUND

Although systems, such as that of U.S. Pat. No. 3,057,685, which use ammonium bisulfate fusion to solubilize metal oxides are known, they are not used in practice because the ammonium bisulfate starts to decompose at a low temperature (above 250° C.), at which the reaction rate is too low. The decomposition products are nitrogen, sulfur dioxide and hydrogen.

SUMMARY OF THE INVENTION

An object of this invention is to provide a process for producing titanium dioxide pigment while avoiding the noted decomposition. A further object is to provide such process without any pollution. A still further object is to provide an economically-feasible commercial process for producing titanium dioxide pigment.

Titanium minerals or slags are heated with alkali-metal (e.g. sodium, potassium and lithium) bisulfate to solubilize all metallic oxides. The resulting product is dissolved in water and filtered. Soluble titanyl sulfate in the obtained filtrate is seeded with ammonia and hydrolyzed to form hydrated titanium dioxide, which is then filtered. Thus-obtained filtrate is completely neutralized with ammonia to form ammonium and alkali-metal sulfates plus metal (e.g. iron) hydroxide, which is then oxidized to filterable yellow iron oxide, which is filtered.

Resulting filtrate containing ammonium and alkali-metal sulfates is concentrated, evaporated and crystalized. By heating the crystals of ammonium and alkali-metal sulfate, ammonia is evolved, and alkali-metal bisulfate, which is recycled, is obtained. The evolved ammonia is also recycled, thus preventing any polluting streams.

The reactions involved are as follows when the alkali-metal is potassium and the metal hydroxide is iron hydroxide:

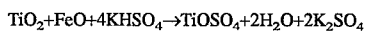
$TiO_2+FeO+4KHSO_4 \rightarrow TiOSO_4+2H_2O+2K_2SO_4$

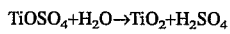
$TiOSO_4+H_2O \rightarrow TiO_2+H_2SO_4$

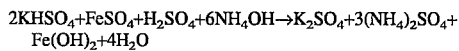
$2KHSO_4+FeSO_4+H_2SO_4+6NH_4OH \rightarrow K_2SO_4+3(NH_4)_2SO_4+Fe(OH)_2+4H_2O$

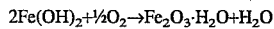
$2Fe(OH)_2+\frac{1}{2}O_2 \rightarrow Fe_2O_3 \cdot H_2O+H_2O$

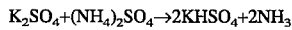
$K_2SO_4+(NH_4)_2SO_4 \rightarrow 2KHSO_4+2NH_3$

According to this invention all reactants recirculate and no pollution streams are produced.

There are a number of different aspects to this invention. One significant aspect involves the reaction of alkali-metal bisulfate with titanium mineral or slag. A distinct aspect relates to recycling alkali-metal bisulfate and ammonia. A further aspect is recovery of yellow iron oxide pigment. The actual sequence of process steps and process equipment organization are so intertwined as to be inseparable parts of the overall invention, which is based on a new use of alkali-metal bisulfate in an economical and commercially-feasible production of titanium dioxide pigment from titanium mineral or slag.

BRIEF DESCRIPTION OF DRAWINGS

FIG. 1 is a schematic flow diagram of apparatus useful for the subject invention.

DETAILS

With reference to FIG. 1, which illustrates an embodiment of apparatus suitable for practicing the subject invention, titanium mineral or slag is introduced from line 1 along with potassium bisulfate from line 2, into a mixer furnace, e.g. a ribbon mixer furnace, 3 in which reaction is effected at temperatures between 300° C. and 500° C. (Although potassium bisulfate is specified in FIG. 1, it can be replaced in part or totally by any other alkali-metal bisulfate, and sodium bisulfate is actually preferred.)

A mixture of titanyl sulfate, potassium sulfate, metal (e.g. iron) sulfate, other sulfates and insoluble material is thus produced and is conducted from the mixer furnace through line 4 to a solubilizing tank 5, to which water is added through line 6. The solubilizing tank has heating means 7 for heating the resulting solution to its boiling point.

Thus solubilized sulfates, together with insoluble material, are conducted from solubilizing tank 5 through line 8 to filter 9. Solids from filter 9 are discharged through line 13, while filtrate from filter 9 is conducted through line 10 to hydrolyzing tank 11, which has heating means 12.

Ammonia from line 14 is added to boiling filtrate in the hydrolyzing tank 11 to seed titanium dioxide crystals. Ammonia is added continuously until a pH of 1.5 is reached. This procedure is required since normal Blumenthal seeding does not operate well in the presence of alkali-metal sulfate. The ammonia seeding procedure insures complete and rapid recovery of the titanium values in the filtrate.

A suspension of titanium dioxide hydrate is thus obtained and is conducted through line 15 to filter 16, in which it is filtered and washed before being led through line 17 to fluidizer calciner 18, which converts the titanium dioxide hydrate to titanium dioxide pigment.

Filtrate from filter 16, containing potassium sulfates, sulfuric acid, metal sulfate and ammonium sulfates, is conducted through line 19 to mixing tank 20. The metal sulfate is advantageously ferrous sulfate, and the mixing tank has an agitator 22. In this tank filtrate from filter 16 is mixed together with ammonia from line 21 to produce a suspension of metal (e.g. ferrous) hydroxide in a solution of potassium and ammonium sulfates.

The suspension is conducted through line 23 to a drier oxidizer 24, where it meets an air current introduced through line 25 and which oxidizes the metal hydroxide. When the metal hydroxide is ferrous hydroxide, it is thus oxidized to yellow ferric oxide. The drier oxidizer is advantageously a spray drier oxidizer in which the liquid portion of the introduced suspension is partially evaporated.

The suspension from drier 24 is conducted through line 26 to filter 27, in which the metal oxide is filtered and washed and delivered through line 28. When the metal oxide is yellow iron oxide, yellow pigment ($Fe_2O_3$) is thus obtained.

Filtrate from filter 27 is delivered through line 29 to evaporator crystallizer 30. Water vapor is exhausted from the evaporator through line 31, and crystals of potassium sulfate and ammonium sulfate are fed through line 32 to reactor 33, in which they are heated to between 300° C. and 350° C. to produce molten potassium bisulfate, pyrosulfate and ammonia vapors.

The potassium bisulfate (in fused or particulate form) and pyrosulfate are recycled to mixer furnace 3 through line 2, whereas the produced ammonia vapors are transmitted through line 34 to line 14 and hydrolyzing tank 11 and/or to line 21 and mixing tank 20.

Throughout the description each reference to potassium can be replaced (partially or wholly) by any other alkali-metal, e.g. sodium and lithium; sodium is actually preferred.

Each required piece of apparatus is known and is commercially available, as are suitable alternatives.

The invention and its advantages will be understood from the preceding description. Various changes may be made in the process and apparatus without departing from the spirit and scope of the invention or sacrificing its material advantages. The process and apparatus hereinbefore described are merely illustrative of preferred embodiments of the invention.

What is claimed is:

1. A process for producing titanium dioxide pigment from titanium mineral or slag, and which comprises the following steps:
   a) admixing the titanium mineral or slag with alkali-metal bisulfate at an elevated temperature to solubilize any metal oxide therein,
   b) dissolving soluble components of the product of step (a) in water,
   c) filtering the product of step (b) to obtain a titanyl-sulfate-containing filtrate,
   d) seeding the titanyl-sulfate-containing filtrate with ammonia,
   e) hydrolozying the titanyl sulfate to form hydrated titanium dioxide and filtering to separate filtrate from thus-produced hydrated titanium dioxide,
   f) neutralizing separated filtrate with ammonia to form ammonium and alkali-metal sulfates and metal hydroxide,
   g) heating ammonium and alkali-metal sulfate crystals to evolve ammonia and to produce alkali-metal bisulfate,
   h) recirculating evolved ammonia to at least one of steps (d) and (f), and
   i) recycling alkali-metal bisulfate from step (g) to step (a).

2. A process of claim 1 wherein the alkali-metal is potassium.

3. A process of claim 1 wherein the alkali metal is sodium.

4. A process of claim 1 comprising the following steps:
   a) admixing the titanium mineral or slag with alkali-metal bisulfate at an elevated temperature to solubilize any metal oxide therein,
   b) dissolving the soluble portion of the product of step (a) in water and filtering to obtain a filtrate containing soluble titanyl sulfate,
   c) seeding the filtrate with ammonia, and hydrolyzing the titanyl sulfate to form hydrated titanium dioxide,
   d) filtering to separate filtrate from the hydrated titanium dioxide,
   e) neutralizing the filtrate with ammonia to form ammonium and alkali-metal sulfates and metal hydroxide,
   f) converting the metal hydroxide to insoluble metal oxide, and separating out the latter by filtration,
   g) concentrating ammonium and alkali-metal sulfates in the obtained filtrate,
   h) crystallizing the ammonium and alkali-metal sulfates,
   i) heating the obtained crystals to evolve ammonia and to produce alkali-metal bisulfate,
   j) recirculating the evolved ammonia to at least one of steps (c) and (e), and
   k) recycling the alkali-metal bisulfate to step (a).

5. A process of claim 4 wherein the alkali metal is sodium.

6. A process of claim 4 wherein the metal hydroxide is iron hydroxide, and yellow ferric oxide pigment is recovered.

7. A process of claim 6 wherein the alkali metal is sodium.

8. A process of claim 4 wherein the alkali-metal bisulfate recycled in step (k) is fused alkali-metal bisulfate.

9. A process of claim 8 wherein the alkali metal is sodium.

10. A process of claim 6 which comprises calcining the hydrated titanium dioxide from step (d) to obtain titanium dioxide pigment.

11. A process of claim 10 wherein the alkali metal is sodium.

12. A process of claim 10 wherein the alkali metal is potassium.

13. A process of claim 1 for producing titanium dioxide pigment from titanium mineral or slag, and in which step (a) is effected in mixer furnace means; step (d) is effected in hydrolyzing tank means; step (f) is effected in mixing tank means; step (g) is effected in reactor means; step (h) is effected through means for recycling gaseous effluent to at least one of the hydrolyzing tank means and the mixing tank means; and step (i) is effected through means to recycle non-gaseous effluent from the reactor means to the mixer furnace means.

14. A process of claim 13 wherein step (h) is effected through means for recycling gaseous effluent to both the hydrolyzing tank means and the mixing tank means.

* * * * *